3,295,956
ORE REDUCTION
Thomas H. Whaley, Mount Vernon, N.Y., assignor to Texaco Inc., New York, N.Y., a corporation of Delaware
Filed Aug. 30, 1965, Ser. No. 483,719
5 Claims. (Cl. 75—26)

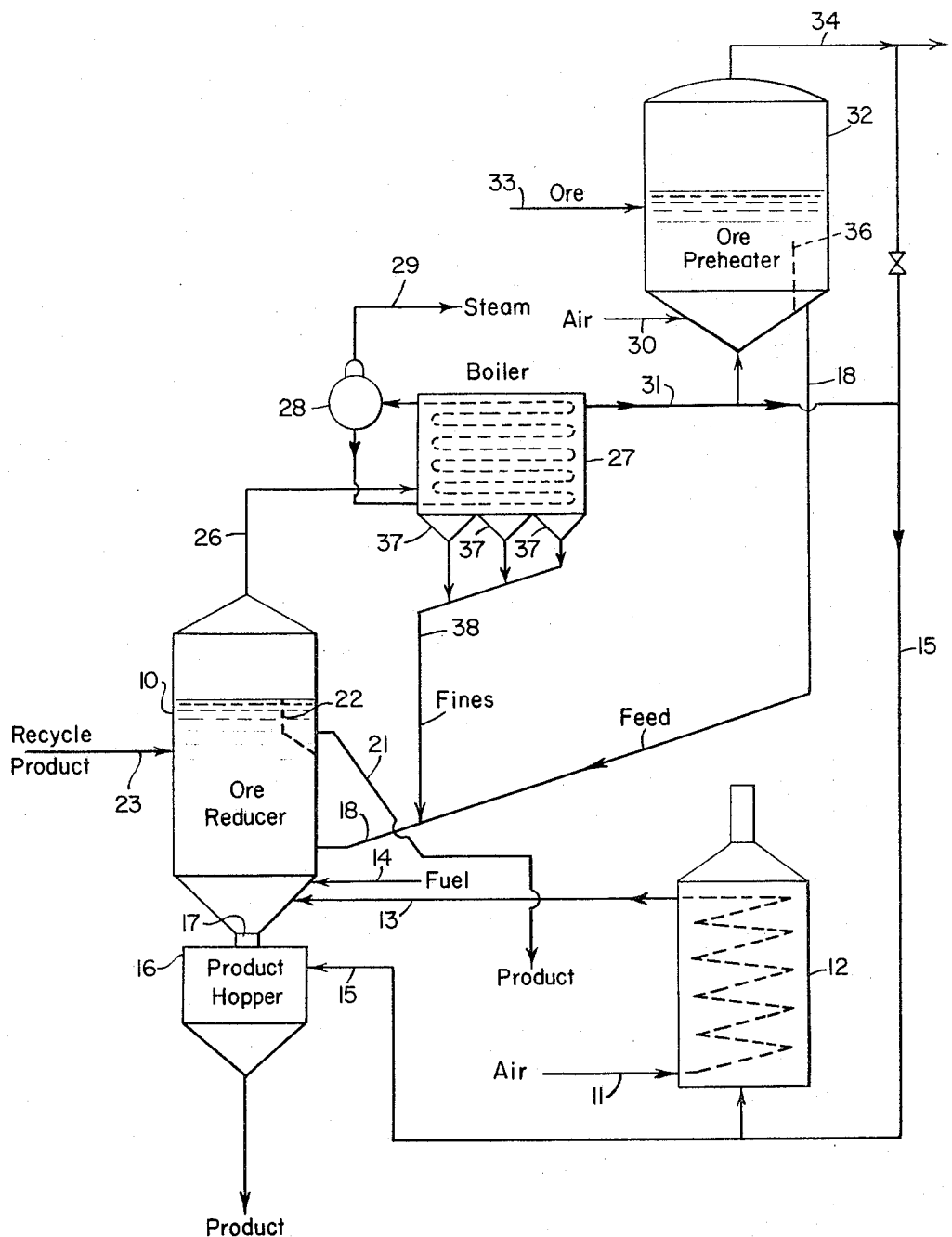

This application is a continuation-in-part of my copending U.S. patent application, Serial No. 160,789, filed December 20, 1961, now abandoned.

This invention relates to a process for reducing metal oxide to metal. In one of its more specific aspects, this invention relates to a process for reducing iron oxide to metallic iron with a reducing gas comprising hydrogen and carbon monoxide in a fluidized bed reactor at a temperature above the softening temperature or fluxing temperature of solid components of the system.

In accordance with one embodiment of this invention, there is provided a process for reducing a reducible metal oxide to metal which comprises passing a hot reducing gas comprising hydrogen and carbon monoxide into contact with a metal oxide in a fluidized bed reaction zone at a temperature above the softening point or agglomeration temperature of part of the solid components of the bed. Heat required for maintaining the reaction zone at reaction temperature and at least part of the reducing gas are generated by partial oxidation of a hydrocarbon in contact with the metal oxide and its reduction products in the fluid bed. The process is carried out at a temperature above the softening temperature of solid components of the system but below the softening or caking temperature of the reduction product. The relative amounts of feed material and reduction product are regulated so that agglomeration of the particles within the reaction zone is controlled and defluidization of the bed of solid particles contained therein are effectively prevented.

The reduction of metal oxides in fluid bed systems is well known in the art of metal ore reduction. However, the art recognizes that the temperatures at which metal ore reduction can be effected are severely limited by the tendency of the fluidized mass to become sticky, causing agglomeration of the ore particles and loss of fluidity of the ore bed. With iron ores, using hydrogen as the reducing gas, agglomeration of the particles and loss of fluidization has been observed at temperatures in the range of 1050 to 1200° F. With mixtures of carbon monoxide and hydrogen, sticking of the ore particles occurs at somewhat higher temperatures, generally around 1600° F. When the temperature of a fluid bed system of the prior art is permitted to reach the temperature at which the particles soften and stick together, agglomeration of the fluidized solid particles takes place forming larger particles or clinkers. The mass agglomeration of the particles, or formation of clinkers, results in rapid defluidization of the bed so that the fluidized bed rapidly becomes a stationary body of clinkers or agglomerated particles. Consequently it is customary practice to carry out the fluid bed reduction of iron oxides with mixtures of hydrogen and carbon monoxide at temperatures below about 1600° F. The melting point of iron and the iron oxides range from about 2550° F. to about 2740° F. The softening of the partciles of iron, oxide-iron mixtures and consequent defluidization of fluid bed systems of the prior art at temperatures well below the melting points of the individual compounds may be the result of the formation of a eutectic mixture of iron and the various oxides.

In the description of the operation of this process, reference is made throughout this specification to the reduction of iron ores or iron oxide. While the process is especially suited to the reduction of iron oxides, and the reduction of iron oxides is of great commercial importance, other metal oxides may be treated in accordance with this process. This process is particularly suited to the reduction of oxides of those metals which like, iron, have melting points above the temperatures at which reduction of the oxides with hydrogen or mixtures of hydrogen and carbon monoxide take place and which have oxide forms or which form eutectics or intermediate solid phases having relatively low softening points causing the particles to become sticky at temperatures considerably below the melting points of the final reduction products.

The process of the present invention is preferably operated at a temperature above the softening temperature of part of the solid material in the fluid bed reactor system but below the melting point of the major portion of the solid particles therein so that controlled particle size increase or growth takes place. In the reduction of iron ore, the transient phase of low softening temperature occurs when the solid particles contain 20 to 50 percent metal. Agglomeration of the mass is prevented by regulating the rate of addition of fresh feed ore material to the reactor so that the amount of low melting or low softening point material present in the reactor at any one time is less than that amount required for defluidization of the bed. Accordingly, the reduction is carried out in a bed of fluidized solid particles which is maintained in the reaction zone at a temperature above the softening temperature or fluxing temperature of part of the solid material but in which the amount of material of low softening temperature is so limited that the agglomeration of larger particles in the bed is substantially prevented.

A particular advantage of the process of this invention, as compared with other fluid bed ore reduction processes, results from the fact that the process can be conducted at temperature levels at or above the softening point of components of the solids contained in the system, to take advantage of maximum rates of reduction. In general, as applied to iron ore, the process is carried out at a temperature in the range of about 1650 to 2000° F., and above the softening temperature of at least one of the solid components in the reducing zone.

In accordance with my invention, solid feed material consisting of metal oxide, e.g., iron oxide, in powdered form is charged to the process either alone or admixed with powdered fluxing agents. Powdered lime, either as a limestone or as calcium oxide, is generally suitable as a fluxing agent when one is desired. The reaction zone consists of a mass or bed of solid particles contained in a suitable vessel and maintained in a fluidized state by the upward flow of reducing gas through the bed. The bed of particles is heated and is maintained at the desired reaction temperature by the partial oxidation of a hydrocarbon fuel which is injected directly into contact with the ore particles and contacted with oxygen-containing gas, preferably preheated, which is separately introduced into the reactor bed. The solid particles contained in the fluidized bed consist predominantly of reduction products, for example, metallic iron, admixed with some iron oxides. These particles are generally considerably larger in size than the particle size of the feed particles supplied to the reducing zone.

It is necessary to control the molten phase which develops during the course of the reduction of iron oxide with carbon monoxide and hydrogen at temperatures of about 1600° F. or higher. In the operation of my process, the molten phase is utilized to control the growth of particles within the fluid bed and prevent substantial carryover or loss of the fine particles from the bed by entrainment in the effluent gas from the reducer.

The operation is initially started by charging the reactor with a bed of relatively coarse particles of reduced product, for example, particles having a size range of 0.5 to 5 millimeters and maintained the particles in a fluid state by passing hot reducing gas upward through the bed. When reducing iron ore, superficial gas velocities required for fluidization of the bed are generally in the range of 0.5 to 5, preferably 1.5 to 4.5, feet per second. Feed materials, suitably in fine particle form, for example, smaller than 100 mesh, Tyler Standard Screen Scale, are charged into the fluid bed. As the feed material is reduced, the partly reduced feed particles reach a state of reduction such that the bed temperature is above their softening temperatures. As the feed particles are softened, they coat the surfaces of the product particles so that gradual growth of the size of product particles takes place as the feed material accumulates and is reduced to product. As the reduction proceeds, the product particles grow to the desired size, at which point they are removed from the reaction zone.

The rate of introduction of fine feed particles into the reactor is controlled so that the agglomerating properties of the coarser product particles are so limited that the larger particles do not stick to one another to any substantial degree. At the same time, the small feed particles are picked up by the larger product particles, coating the surface of the larger particles and gradually increasing the size of the product particles.

The process of my invention will be better understood from the following detailed description of a specific embodiment thereof representing the best mode contemplated by me for carrying out the process of my invention.

The figure is a simplified flow diagram of a continuous ore reduction operation illustrating diagrammatically an arrangement of apparatus suitable for carrying out the process utilizing a mixture of hydrogen and carbon monoxide as gaseous reducing agent. In the description of this figure, iron ore is taken as an example of the process of this invention.

With reference to the figure, reduction of iron ore, for example, is carried out in ore reducer 10 in which a fluidized bed of solid particles of reduction product is maintained. The reducer suitably is in the form of a vertical, cylindrical steel vessel lined with refractory and insulation. Oxygen-containing gas, e.g., air or oxygen-enriched air, from line 11 is preheated in heater 12, preferably to 1000° F. or higher, and passed through line 13 into the lower portion of ore reducer 10. Carbonaceous fuel, preferably hydrocarbon gas or oil and suitably preheated, preferably to 600° F. or higher, is introduced through line 14 into admixture with the oxygen-containing gas. The fuel and oxygen react to produce reducing gas comprising carbon monoxide and hydrogen which passes upward through the fluid bed in reducer 10. Air preheated to 1600° F. and natural gas preheated to 1200° F. produce a satisfactory reducing gas. With oxygen, oxygen-enriched air, liquid hydrocarbons, or a combination of such reactants, less preheat is necessary than with natural gas and air. Recycle reducing gas from line 15 is passed through product hopper 16 and line 17 into the lower part of ore reducer 10.

Partial oxidation of the hydrocarbon fuel by reaction with the oxygen-containing gas takes place in the bed to form reducing gas comprising carbon monoxide and hydrogen which passes upwardly through the bed at a velocity in the range of 1.5 to 3.5 feet per second sufficient to maintain the particles of iron and iron oxide in a fluidized condition. Sufficient heat is liberated by the reaction between the fuel and oxygen-containing gas to maintain the desired temperature level within the bed. The temperature of the bed of ore and reduction products of the ore is kept within the range of 1650 to 2000° F. and above the softening or fusion temperature of the low softening point part of the solid phase in the bed.

The low softening point or fusion temperature varies to some extent depending upon the composition of the ore charged to the bed, the size of the particles and the rate of reduction, which in turn depends to some extent upon the reducing potential of the gas generated in the fluid bed. Effective temperature control may be maintained by direct observation of the fluid bed and of the particle sizes of the products withdrawn therefrom. When the bed temperature is above the softening point or fusion temperature of some of the solid in the bed, controlled particle size growth takes place. The operator can control the bed temperature by regulating the amount and relative proportions of oxygen-containing gas and hydrocarbon fuel supplied to the reducer. Generally, the proportions of air to fuel are adjusted to produce maximum amounts of carbon monoxide and hydrogen and minimum amounts of carbon dioxide and water consistent with the heat load on the system and permissible preheat temperatures. As the ratio of fuel to air is decreased, the temperature in the bed increases, but, at the same time, the reducing capacity of the resulting gas stream is decreased. This follows from the fact that more carbon dioxide and water are produced. If the ratio of fuel to air is increased, the bed temperature falls and a point is reached where excessive carbon production occurs. Generally it is desirable to proportion the amounts of oxygen-containing gas and fuel supplied to the reducer so that from about 0.5 to 3 percent of the carbon contained in the fuel is liberated as free carbon.

In this particular example, preheated iron ore, preheated to about 1500° F., is supplied to the reducer through line 18 in admixture with recycled fine particles. The ore may be supplied to the reducer in the form of powder or fine particles, for example, particles smaller than 100 microns or 150 mesh, Tyler Standard Screen Scale, although larger particle sizes up to about 2500 microns or about 0.1 inch, can also be used effectively. The ore and recirculated fines are introduced into the reducer in the lower portion of the fluidized bed of particles contained therein, which are more than 50 percent reduced to metallic iron, preferably above the point of introduction of fuel to the reducer. As the finely powdered ore is carried upwardly through the reducer by the reducing gases generated from the air and fuel, the ore undergoes reduction to metallic iron. During this reduction, the ore passes through a phase in the range of 20 to 50 percent metallic iron wherein it has a softening point or fluxing temperature equal to or below the temperature in the reducer. These fine particles are fused to the surface of other particles, usually larger particles of reduction products within the fluidized bed resulting in growth of the particles until the desired size range is reached. Product particles are also formed by reduced and partly reduced fine particles sticking to one another, the partly reduced fine particles tending to attach themselves to the surfaces of more nearly reduced particles. In this way, the bed is self sustaining.

As the particles grow in size due to accumulation of fine particles on their surfaces, they become less readily fluidized than the bulk of the particles in the bed of solids within the reducer. The more dense, less readily fluidized particles tend to accumulate in the bottom of the reducer and drop through line 17 into product hopper 16 against the upward flow of recycled reducing gas flowing from the product hopper into the reactor. The velocity of gas from product hopper 16 upward through line 17 is sufficient that the smaller particles are supported by the upflowing stream of gas and are largely prevented from descending into product hopper 16. The particle size of the material dropping into the product hopper can be controlled by controlling the amount of gas supplied to hopper 16 and consequently its velocity in line 17.

Generally, it is desirable that the product particles have an average diameter of 0.1 inch, or larger, up to about one fourth inch. Some agglomeration of particles may occur resulting in the formation of agglomerate clinkers or composites which do not settle to the bottom of the fluidized bed of solids in the reducer but which float to the top of the bed. These agglomerates are removed through line 21. A suitable skimming device, such as weir 22, in the ore reducer permits withdrawal of solid particles, including the agglomerates, from the upper surface of the bed; the skimmed particles are discharged from the reducer through line 21. Particles meeting product specifications, e.g. 85 percent metal or more, but of insufficient size to permit withdrawal through outlet 17 also may be withdrawn through line 21. It is desirable to retain the particles in the bed long enough to carry the reduction to the point where the metal oxide is reduced to metal to the extent of 80 percent or more, preferably 85 to 90 percent metal.

It is generally desirable to recycle part of the product to the fluidized bed. The smaller particles of product serve as a nucleus for the formation of product particles of desired size. Generally it is desirable to return undersized particles which may find their way into product withdrawn through line 21 or from the product hopper. This may be accomplished by introducing the recycle product particles into the ore reducer, preferably in the upper portion of the fluid bed, through line 23. Small particles of product may also be desirably supplied to the bed when the rate of formation of small product particles in the fluid bed is less than the rate at which large particles are withdrawn. Small particles for recycle may be made by crushing some of the product particles. These are relatively easily crushed.

The fluid bed in the ore reducer comprises predominantly particles of reduction product. Product particles of desired size range, up to several millimeters, withdrawn from the reducer may be charged to a suitable furnace, for example an open hearth furnace, for the production of steel. The product generally contains 85 percent or more of the iron oxide charge in the form of metallic iron.

Hot gases from the reducer 10 flow through line 26 to a boiler 27 where part of the heat contained in the gas stream is recovered in the form of steam. Preferably the boiler is in the form of a water tube boiler provided with the usual steam drum 28 in which steam is separated from the boiler water. The steam is discharged through line 29 and is useful for process steam in the plant. Part of the gas from ore reducer 10 is used to preheat the ore suitably to about 1500° F. Air supplied from line 30 may be reacted with gas from the ore reducer supplied to ore preheater 32 through line 31 to produce a hot reducing atmosphere in ore preheater 32.

Preheater 32 conveniently is in the form of a vertical cylindrical vessel in which a downwardly moving bed of powdered iron ore is heated by the passage of hot gas from line 31 and its reaction products when combined with air from line 30 upwardly therethrough. Suitable dust separators, not illustrated, are provided to prevent loss of fines.

Ore or metal oxide from other sources, suitably finely powdered, is introduced to the preheater through line 33. Gases leaving the ore preheater through line 34, are useful as fuel gases for preheating the air and fuel for the ore reducer or for other plant uses. In addition, sensible heat may be recovered from the gas stream from line 34 by means of suitable heat exchangers, not illustrated, e.g., to preheat air for the ore reducer. Part of the gas stream from line 31, which may be treated for removal of carbon dioxide and water vapor, is recycled through line 15 to the ore reducer. In this particular embodiment, gas from line 31 is supplied also to heater 12 as fuel for preheating air for the ore reducer. About one fourth of the net gas made in the ore reducer is burned to supply preheat for the air and natural gas streams supplied to the ore reducer.

Preheated ore is withdrawn from preheater 32 through line 18 as feed to ore reducer 10. A baffle 36 may be provided in the ore preheater to facilitate withdrawal of ore through line 18.

Gases leaving the ore reducer through line 26 contain entrained carbon and fine particles of ore carried over from the fluid bed in reducer 10. Boiler 27 is preferably designed as a low gas velocity, water tube boiler wherein the velocity of the gases are such that substantially all of the fine particles fall out of the gas stream. The fine particles are collected in bins 37 in the lower part of the boiler and pass through line 38 to line 18 where they are combined with preheated ore from preheater 32 and reintroduced into reducer 10.

In carrying out the process of this invention, it is desirable that the bed in the ore reducer be at least 3 feet deep. Deeper beds, e.g. 4.5 to 20 feet in depth, are preferred. Although even deeper beds, e.g. 30 feet to 90 feet could be used, problems of excessive pressure drop and uneven fluidization occur. A bed depth of at least 3 feet, preferably 4.5 to 10 feet, is preferred in the ore preheater.

*Example I*

Reduced iron ore, i.e. an ore previously reduced, containing about 80 percent of the iron content in metallic form is charged into a vertical cylindrical reactor having an internal diameter of about one foot and an overall height of 27 feet. The reduced ore particles range in size from about 200 mesh to about ⅛ inch in average diameter. Air preheated to 1600° F. is introduced into the lower end of the reactor at the rate of 1280 standard cubic feet (60° F. and 1 atm.) per hour. Natural gas preheated to 1200° F. is introduced at the rate of 445 standard cubic feet per hour into the lower part of the reactor into contact with fluidized ore particles and preheated air. The natural gas contains approximately 92 percent methane, 2 percent ethane, 1 percent higher hydrocarbons, 1 percent carbon dioxide and 4 percent nitrogen.

The air and natural gas react with one another to form a reducing gas having a calculated composition of about 30 percent hydrogen, 16 percent carbon monoxide, 6 percent carbon dioxide and water vapor, 46 percent nitrogen and inerts, and 2 percent $C_1$ and $C_2$ hydrocarbons. The reducing gas stream, which has a calculated volume of 2275 standard cubic feet per hour fluidizes the particles as a dense phase fluid bed at a temperature of about 1800° F. An average bed height of 20 feet, with a charge of about 2,200 pounds of solid material is maintained in the reactor. Fine particles of −200 mesh ore containing about 65 percent iron is charged into the lower part of the bed above the point of introduction of natural gas, at the rate of about 100 pounds per hour. Coarse particles ranging up to about ¼ inch in diameter and 85 percent reduced to metallic iron are withdrawn from the bottom of the reactor.

*Example II*

Los Angeles 840 Bunker Fuel Oil of 8.9 A.P.I. gravity, having a gross heating value of 18,200 B.t.u.'s per pound is dispersed in 0.25 pound of steam per pound of oil and the resulting dispersion preheated to 750° F. is charged into the reactor of Example I at the rate of 24.5 pounds of oil per hour and reacted with 1,477 standard cubic feet per hour of air preheated to 1000° F. The calculated composition of the resulting reducing gas is about 23 percent carbon monoxide, 17.5 percent hydrogen, 7.2 percent carbon dioxide and water vapor; 0.7 percent methane, 51.5 percent nitrogen and 0.2 percent hydrogen sulfide. An estimated 4 percent of the carbon in the oil is liberated as free carbon. The particles of reduced product contain carbon particles from the oil.

I claim:
1. A process for reducing iron oxide to metal which comprises establishing a fluidized mass of relatively coarse solid particles comprising reduction products of said iron oxide in a reaction zone, introducing oxygen-containing gas into said bed and injecting hydrocarbon fuel into admixture with said oxygen-containing gas for reaction therewith directly into contact with said solid particles in the lower part of said fluidized mass in relative proportions and amounts effective for the production of a reducing gas mixture of carbon monoxide and hydrogen at a temperature within the range of 1650 to 2000° F. and in a volume sufficient to maintain said mass substantially in the form of a dense phase fluidized bed at a temperature in the range of 1650 to 2000° F. and above the softening temperature of a portion of partially reduced solid particles contained therein, supplying iron oxide ore in fine particle form to said mass at a rate such that said portion comprises only a minor amount of the total solid present within said mass at any given time and as said partially reduced particles are softened and become attached to other solid particles in said bed composite particles of larger particle size than said iron ore are formed, and withdrawing said composite particles from said reaction zone as a product containing at least 80 percent of the original iron oxide in metallic state, said composite particles larger in size than said iron ore particles and more buoyant than average particles in said mass being removed from the upper portion of said fluidized bed.

2. A process according to claim 1 wherein said oxygen-containing gas is air heated to a temperature above about 1000° F. prior to introduction into said reaction zone.

3. A process according to claim 1 wherein said hydrocarbon is liquid hydrocarbon heated to a temperature above 600° F. prior to introduction into said reaction zone.

4. A process according to claim 1 wherein said air is heated to about 1600° F. and said hydrocarbon fuel is hydrocarbon gas preheated to a temperature of about 1200° F. prior to introduction into said reaction zone.

5. A process according to claim 1 wherein smaller composite particles withdrawn from said fluidized bed are returned to said fluidized bed as nuclei for the formation of larger composite particles.

References Cited by the Examiner

UNITED STATES PATENTS

| | | | |
|---|---|---|---|
| 2,481,217 | 9/1949 | Hemminger | 75—26 |
| 2,711,368 | 6/1955 | Lewis | 75—26 |
| 3,019,100 | 1/1962 | Robson | 75—26 |

OTHER REFERENCES

Blast Furnace: Coke Oven and Raw Materials Proceedings A.I.M.E., vol. 19, 1960, Chicago Meeting, April 4 to 6, 1960, pp. 205–218.

BENJAMIN HENKIN, *Primary Examiner.*

DAVID L. RECK, *Examiner.*